United States Patent [19]
Wackerman

[11] Patent Number: 4,593,676
[45] Date of Patent: Jun. 10, 1986

[54] AUTOMATIC CLEANING GAS BARBECUE GRILL

[75] Inventor: Gunther G. Wackerman, Paris, Ill.

[73] Assignee: UNR Industries, Inc., Chicago, Ill.

[21] Appl. No.: 459,350

[22] Filed: Jan. 20, 1983

[51] Int. Cl.$^4$ .............................................. A47J 37/00
[52] U.S. Cl. .................... 126/41 R; 126/39 R
[58] Field of Search ............... 126/19 R, 41 R, 19 M, 126/25 R, 273 R, 273 A, 299 F, 39 G, 39 R; 431/3

[56] References Cited

U.S. PATENT DOCUMENTS

| | | | |
|---|---|---|---|
| 2,655,455 | 10/1953 | Steele | 431/3 X |
| 3,298,361 | 1/1967 | Clark | 126/25 R |
| 3,386,432 | 6/1968 | Hanson | 126/41 R |
| 3,500,812 | 3/1970 | Korngold | 126/25 R |
| 3,624,742 | 11/1971 | Hurko | 126/41 R X |
| 3,646,928 | 3/1972 | Grafton et al. | 126/25 R X |
| 3,667,449 | 6/1972 | Persinger et al. | 126/25 R X |
| 3,671,278 | 6/1972 | Borowski | 126/19 R X |
| 3,785,275 | 1/1974 | Keats et al. | 126/25 R |
| 3,915,149 | 10/1975 | Kemp | 126/273 BR |
| 3,938,494 | 2/1976 | Clark | 126/41 R |
| 3,962,561 | 6/1976 | Maitenaz | 126/19 R X |
| 4,043,312 | 8/1977 | Kern | 126/41 R |
| 4,267,816 | 5/1981 | Koziol | 126/44 R |
| 4,281,633 | 8/1981 | Wackerman | 126/25 R X |
| 4,434,781 | 3/1984 | Koziol | 126/25 R |

Primary Examiner—James C. Yeung
Assistant Examiner—Carl D. Price
Attorney, Agent, or Firm—Clement and Ryan

[57] ABSTRACT

An automatic cleaning gas barbecue grill comprising a main container and a cover, with the interior surfaces of both being coated with a coating that includes an oxidizing catalyst. The grill has valve means for controlling the flow rate of cooking gas, with at least one predetermined rate of flow for the principal cooking mode of operation of the grill and at least one predetermined higher rate of flow for an automatic cleaning mode of operation. The temperature along the interior surfaces of the main container walls and of the cover is maintained, at substantially all points along the surfaces, at a level at least high enough to cause substantially complete oxidation of waste materials that accumulate on the interior surfaces during ordinary use. The tips of flame jets that project from the burner exit ports extend to locations adjacent the main container walls without damaging the coating on the interior surfaces of the walls. A horizontal positioning plane for the gas burner, the main container side walls, and a horizontal plane in which the top surface of the grate on which pieces of refractory materials are supported define a main combustion chamber having a specified volume and vertical position. The grill has exhaust outlet means for the automatic cleaning mode of operation to permit the escape of exhaust mixture and avoid the accumulation of carbon monoxide above safe levels, while limiting the escape of the exhaust mixture to maintain the necessary waste material combustion temperature along the inner surfaces of the main container walls and cover. Specific values of the cross-sectional area of the exhaust outlet means for the automatic cleaning mode of operation are provided.

46 Claims, 6 Drawing Figures

FIG. 2
FIG. 6
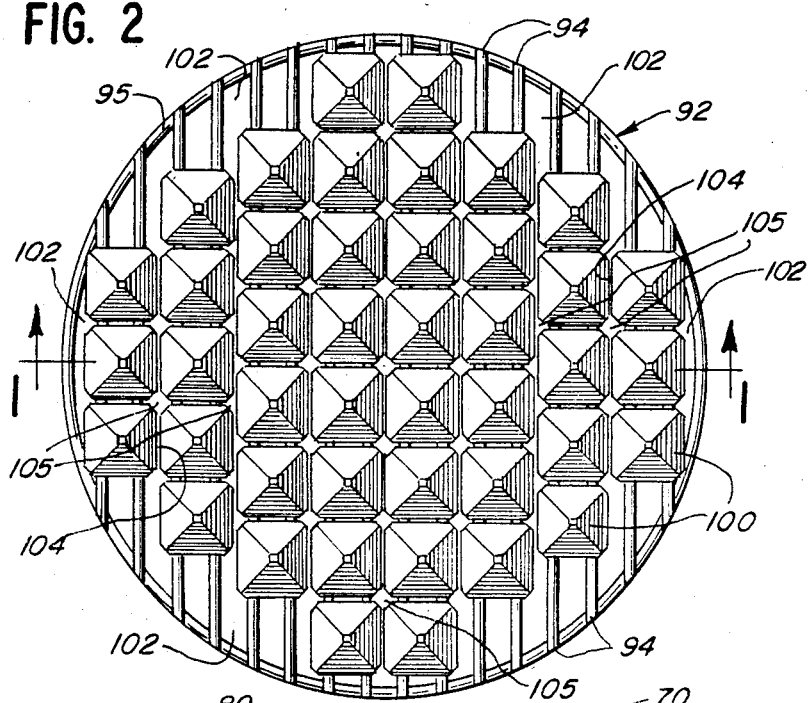
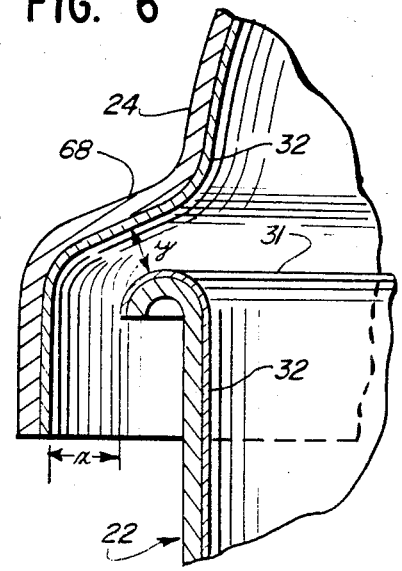
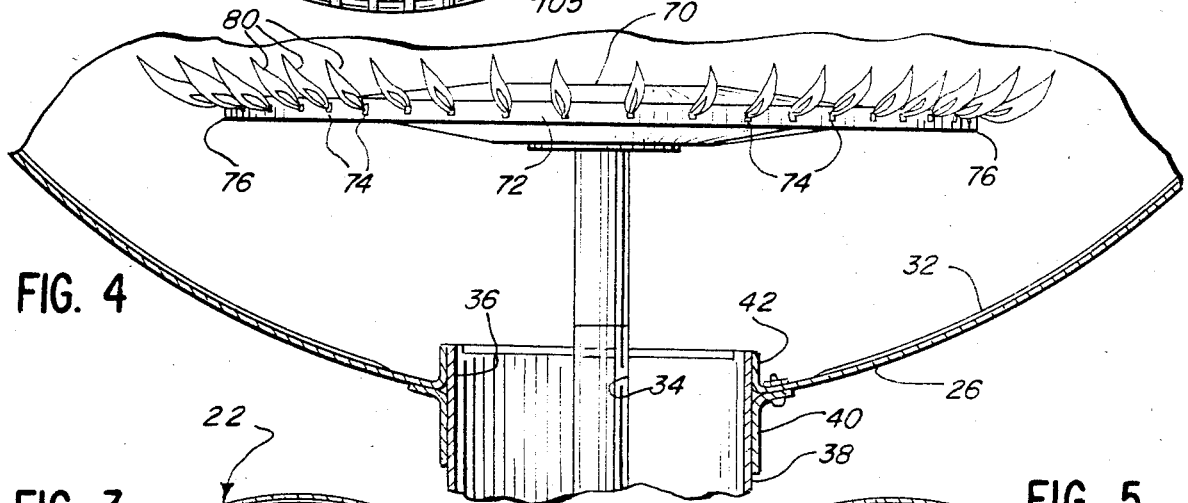
FIG. 4
FIG. 3
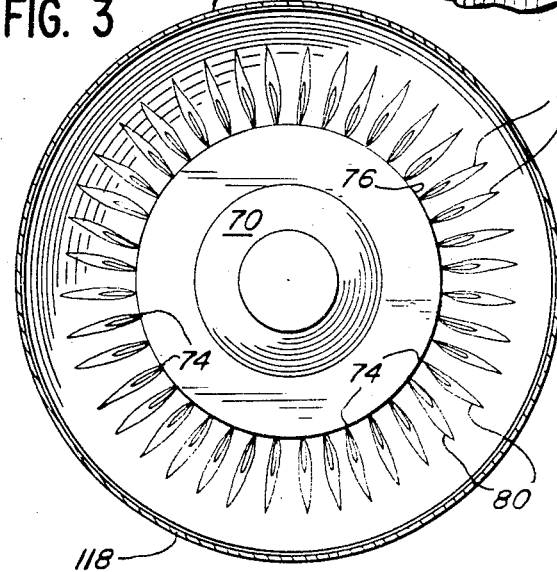
FIG. 5
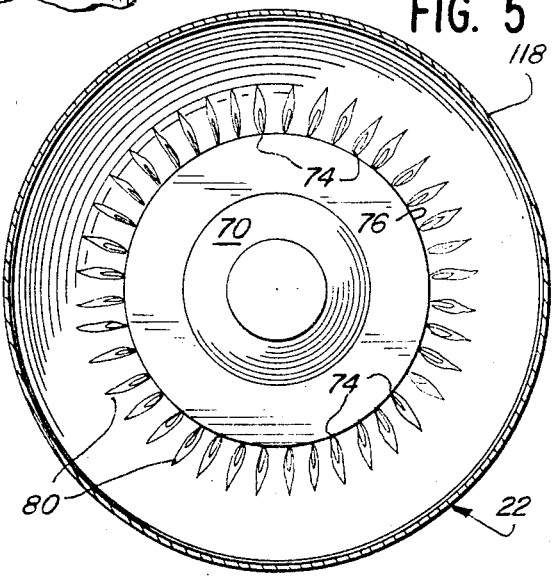

AUTOMATIC CLEANING GAS BARBECUE GRILL

FIELD OF INVENTION

This invention relates to a gas barbecue grill, and in particular to such a grill that has an automatic cleaning capability.

BACKGROUND OF INVENTION

From the time that conventional gas ovens in kitchen stoves were first used, it was recognized that the problem of removing grease, charred food and other waste materials that dropped or spattered onto the interior bottom, side or top walls of the oven during cooking presented great difficulty and inconvenience. The interior walls were difficult to reach. Oven cleaners were frequently very harsh on the user's hands. The waste materials were frequently even more malodorous during removal than they were before the cleaning process was undertaken. The oven cleaners themselves often had disagreeable odors, and sometimes even gave off fumes that were actually harmful to the user. Finally, a good deal of physical effort was always required to clean the oven walls.

Because of these problems, some 20 years or so ago ovens having an automatic cleaning capability were developed. Some of these were of the self-cleaning type, which utilize a so-called pyrolytic cleaning process at an elevated temperature of as much as 900° F. to burn off accumulated waste material following each use of the oven. Others were of the continuous cleaning type involving so-called catalytic cleaning at temperatures in the usual range of temperatures employed during cooking in an oven, as for example 325° F. to 550° F. In either of these automatic cleaning methods, food soil and residue are burned off the interior walls of the oven, and the walls are left clean.

Outdoor cooking with barbecue grills has grown steadily in popularity since about the end of World War II. The widespread use of covered charcoal grills has accelerated this growth in popularity, especially in the last 20 to 30 years. The introduction of covered grills heated by gas has further stimulated the public's interest in outdoor cooking.

Cooking on covered barbecue grills, whether charcoal or gas-fired, ordinarily proceeds at about 200° to about 400° F. Perhaps because of these relatively low temperatures, it appears that prior to applicant's invention no one had considered it possible to utilize either self-cleaning or continuous cleaning for barbecue grills, whether charcoal or gas. To anyone who attempted to design an automatic cleaning barbecue grill, it might very well have seemed impossible to maintain a sufficiently high temperature, and a sufficiently uniform distribution of heat, that such a cleaning cycle could be successfully achieved.

There have been a number of reasons for this. The single walled cavity used in outdoor barbecue grills has not provided much heat insulation. An outdoor grill is frequently unavoidably exposed to a considerable amount of wind. The grill is very often not well enough sealed to retain sufficient heat to sustain a cleaning cycle. Probably most important of all, no one has seemed aware of the importance of extremely careful control of the pattern of heat production, coupled with extremely careful control of a substantially uniform pattern of distribution of heat throughout the grill.

Specifically, it has not been understood prior to the present invention how to position either the gas burner, or the grate that in conventional gas barbecue grills supports pieces of refractory material above the burner, to achieve the high oxidizing temperatures and the substantially uniform distribution of temperatures throughout the interior surfaces of the grill that are necessary in an automatic cleaning grill. Similarly, the importance of careful control of the size of the exhaust outlet or outlets for an automatic cleaning grill has evidently not been understood.

By his novel construction of the gas grill of this invention, applicant has overcome all the problems that have been mentioned, and has successfully produced an outdoor barbecue grill with an automatic cleaning capability.

SUMMARY OF THE INVENTION

The automatic cleaning gas barbecue grill of the present invention—as in a conventional gas barbecue grill—includes a gas burner, a grate above the burner on which pieces of a refractory material are supported, and a cooking grid above the grate for supporting the foodstuffs that are to be cooked. It likewise has a source of cooking gas that is mixed with primary air from outside the grill and introduced into the gas burner, and a separate inlet opening for secondary air to be introduced into the grill and guided up around the gas burner, as in known barbecue grills.

The novelty in the grill of this invention resides in the unique combination of six critical features which together unexpectedly produce an automatic cleaning capability:

1. The interior surfaces of the main container and its cover are coated with a coating that includes an oxidizing catalyst.

2. Valve means is provided for controlling the flow of cooking gas at at least two rates of flow—at least one for a principal cooking mode of operation of the grill and at least one higher rate for an automatic cleaning mode of operation. In the cleaning mode, the temperature along the interior surfaces of the grill is maintained at substantially all points at a level at least high enough to cause substantially complete oxidation of small particles of charred foodstuffs, and fats, oils and sauces employed in cooking, that accumulate as waste materials on the interior surfaces during ordinary use, but does not rise above an acceptable level that is safe and will avoid damage to the catalytic coating on the interior surfaces of the grill. The flow rate during the automatic cleaning mode is such that the tips of the flame jets that project from the burner exit ports extend to locations adjacent the main container walls—suitably within about two inches or less measured normal to those walls—without damaging the coating on the interior surfaces of the walls.

3. The main combustion chamber—which is defined by (a) a horizontal positioning plane that cuts substantially through the geometric centers of the gas burner exit ports, (b) the main container side walls, and (c) the horizontal plane in which the top surface of the grate is located—has a volume in a range between about 10 percent and about 28 percent of the total volume of the interior of the grill. Improved results are obtained when this percentage is between about 13 percent and about 24 percent, and the preferred figure is about 17 percent.

4. The center of gravity of the air within the above defined main combustion chamber is at a level spaced above the lowest point on the interior surface of the bottom wall of the main container, when the grill is standing upright in position for use in cooking, by a distance in a range between about 48 percent and about 62 percent of the distance that the center of gravity of the air enclosed by the main container and its cover is spaced above that lowest point. Improved results are obtained when this percentage is between about 51 percent and about 59 percent, and it is preferred that it be about 55 percent.

5. The pieces of refractory material that are supported on the grate are distributed across the entire area of the grate, leaving (a) a gap that is free of any such material that extends substantially around the grate, either within or outside the perimeter thereof, or both, and (b) a plurality of smaller gaps between the various pieces of refractory material thus distrubuted.

6. An exhaust outlet means is provided for the automatic cleaning mode of operation of the grill to permit the escape of the exhaust mixture resulting from the combustion of the cooking gas and to avoid the accumulation within the grill of carbon monoxide above safe levels, while limiting the escape of the exhaust mixture from the grill to maintain the necessary waste material combustion temperature along the inner surfaces of the grill.

The relationship between items 3 and 4 just described is preferably such that the volume of the main combustion chamber has a position within the range of volumes specified that corresponds generally to the position that the distance above the main container bottom of the center of gravity of the air within the main combustion chamber has within the range of values specified for that distance.

The preferred temperature for the automatic cleaning mode of operation of the grill that is maintained along the interior surfaces of the main contained walls and its cover in this invention is at least about 500° F. As will be apparent to one skilled in the art, the operative temperature may be somewhat higher (or perhaps even slightly lower) than 500° F., depending upon (1) the nature of the various soiling agents that may drop or spatter on the interior surfaces of the main container walls and its cover, and (2) the length of time the waste materials are permitted to remain on the interior surfaces of the grill before putting the grill through its automatic cleaning cycle. In fact, it is believed that some degree of automatic cleaning of the interior surfaces of the main container walls and the grill cover may be achieved—with partial oxidation of the waste materials on those surfaces through the catalytic action of the coating disposed thereon—even at temperatures quite a bit below 500° F. if the soiling conditions presented are not too extreme.

The exhaust outlet means of the grill produces satisfactory results in the grill's automatic cleaning mode of operation if it has a total cross-sectional area, for every cubic foot of the volume enclosed by the main container and the main container cover when the latter member is in place upon the main container, (in other words, the total volume of the interior of the covered grill), that is between about 3.04 sq. in. and about 3.45 sq. in. times a conversion fraction in which (1) the numerator is (a) the predetermined flow rate for the automatic cleaning mode of operation for the particular cooking gas used with the grill, plus (b) the minimum flow rate of primary and secondary air required for substantially complete combustion of the cooking gas, at said predetermined automatic cleaning flow rate, both of which flow rates are expressed in cubic feet per minute, and (2) the denominator is 5.9 c.f.m. Improved results are obtained if the figures just defined are between about 3.08 and about 3.29, and it is preferred that the figure be about 3.12. The reason for the use of the indicated conversion fraction, and the manner in which it is derived, will be explained below in this specification.

The main container and its cover may be rectilinear or curvilinear in vertical cross-sectional shape, as desired. One grill shape that has been found to produce very uniform distribution of heat throughout the barbecue grill is one in which the main container has a generally hemispherical shape, the cover is ellipsoid in shape, and the cover is approximately one-half as deep as the main container.

Prior to the invention of applicant's novel gas barbecue grill, no one, so far as applicant knows, ever combined all the elements and features listed above to achieve a grill with automatic cleaning capability. Catalytic coatings have been widely used in conventional ovens, but never in a commercially available barbecue grill. So far as applicant is aware, of the features listed, only the manner of distribution of pieces of refractory material across the grate has been fully known in prior gas barbecue grills. The two features of a valve means and an exhaust outlet means have of course been known in general form in prior gas barbecue grills, but the maintenance of a temperature that is substantially uniform along the interior surfaces of the walls of the grill and is at least high enough to cause substantially complete oxidation of accumulated waste material is made possible only by the presence of these two features in the specific forms indicated above, as well as by the presence of the other specific features that are included in the definition of the grill of this invention.

Although, as just indicated, the specified distribution of pieces of refractory materials across the grate has been known, applicant is not aware that any of the other features listed above have been present even accidentally in any prior art gas barbecue grills. If any of them have been accidentally disclosed, they have not been found in the combination listed above, nor has the importance of any of them in making an automatic cleaning grill possible ever been realized.

Through the combination of the defined elements and features, the improved gas barbecue grill of this invention has unexpectedly and for the first time achieved in one grill all the following critically important goals:

1. A sufficiently high temperature for automatic cleaning of all the interior surfaces of the grill, which is not such an elevated temperature that the user of the grill will risk accidental injury if a few simple precautions are observed.

2. Optimum temperatures for best results during the principal cooking cycle, including substantially uniform distribution of heat during that cycle across the cooking grid on which the foodstuffs to be cooked are supported, with no troublesome variations such as cold spots or unnecessary hot spots.

3. A high level of combustion efficiency during both cooking and cleaning, which avoids the problems of carbon monoxide poisoning and carbon monoxide explosive potential that can result from incomplete combustion in gas barbecue grills.

METHOD OF DESIGN OF GRILL OF THIS INVENTION

Certain aspects of the automatic cleaning gas barbecue grill of this invention can be established by resort to the prior art. Among these are the general structure of the grill, and the predetermined rate or rates of flow of the cooking gas (which may be, for example, low, medium, and high rates of flow) for the principal cooking mode of operation of the grill. Other aspects of the grill are taught only by this invention.

The term "cooking gas" as used in this specification and the attached claims refers to any gaseous fuel that is suitable for use in a stove, grill or other cooking device. The cooking gas sources most commonly used in barbecue grills are liquified hydrocarbons or petroleum gases such as propane and butane. Any gas barbecue grill constructed according to this invention will typically be designed for a given type of cooking gas, but may be used with any other cooking gas if with that gas the necessary temperature can be maintained for oxidation of waste materials on the interior surface of the grill during the automatic cleaning mode of operation.

Factors Affecting Determination Of Proper Size And Type Of Gas Burner And Flow Rates Of Cooking Gas In the design of the barbecue grill of this invention, the size and type of gas burner, as well as the gas flow rate for the cleaning mode of operation, in which accumulated waste materials are substantially cleaned off the interior surfaces of the grill, will be selected in part according to principles known in the prior art, and in part according to the limitations of the defined invention that specify (1) that a temperature shall be maintained, substantially uniformly across the interior surfaces of the grill, that causes accumulated waste materials to be substantially oxidized but still does not rise above an acceptable level, and (2) that the tips of the flame jets that project from the burner exit ports shall extend to locations adjacent the main container walls without damaging the coating on the interior surfaces of the walls.

The flow rate for the cooking gas in the automatic cleaning mode of operation of this grill is higher than the rate of flow of cooking gas in any grill known to applicant. In addition, the exit ports of the gas burner are more closely spaced to the main container walls than is true of most, if not all, prior gas barbecue grills. These adjustments are necessary because the tips of the flame jets that project from the gas burner exit ports must extend to locations adjacent the main container walls —suitably within about two inches or less measured normal to those walls—in order to achieve temperatures along the interior surfaces of the main container walls that are high enough to cause substantially complete oxidation of waste materials that have accumulated there.

It should be noted that if the user of the barbecue grill of this invention desires, the grill of this invention may be used for cooking for a short period of time at a higher temperature than is usual in its principal cooking mode of operation, by cooking with the higher flow rate that is preselected for the automatic cleaning mode of operation. This may be done, for example, if the user wishes to sear a particular cut of meat by exposing it briefly to the higher temperature which is ordinarily associated only with the automatic cleaning mode of operation of the grill. This type of cooking for a limited period of time may be considered as being secondary to the principal cooking mode, in which mode the user of the grill makes a selection from whatever predetermined temperatures are provided for the cooking of various foodstuffs in more usual ways.

A common type of cooking gas for gas barbecue grills for home use is bottled propane. If desired, the barbecue grill of this invention may be constructed for use with butane or any other gas with a suitably high heating value. If the grill is designed for use with a cooking gas that has a higher B.T.U. content than propane has, one skilled in the art will recognize that the gas flow rates for both the cooking and cleaning modes of operation of the grill may be lower, and the over-all horizontal dimensions of the gas burner must then be increased, or smaller holes or fewer holes employed, or a combination of all these changes made, in order to bring the flame tips close enough to the main container walls. If the grill is designed for use with a gas that has a lower B.T.U. content than propane has, one skilled in the art will recognize that the gas flow rates will have to be higher, and in that event a burner must be used that has smaller over-all horizontal dimensions, or larger holes or more holes, or a combination of all these, in order to keep the flame tips from extending so far outward that they will damage the coating on the interior surfaces of the main container walls.

In determining the size and type of gas burner and the desired flow rate for the cleaning mode of operation, it must always be kept in mind that the temperature maintained in that mode—such as, for example, 500° F. or higher—must cause substantially complete oxidation of the small particles of charred foodstuffs, and fats, oils and sauces employed in cooking, that accumulate as waste materials on the interior surfaces of the grill during ordinary use. As used in this specification and the appended claims, the term "ordinary use" includes all uses of a gas barbecue grill that are common among typical users of such grills, including uses described or referred to in commercially distributed advertising literature for gas barbecue grills.

The temperature of the exterior surfaces of the main container walls and of the cover should not, however, rise above an acceptable level at which the user of the grill will not be injured so long as he or she avoids leaning against the grill for too long a time and observes other reasonable precautions.

The catalytic coating upon the interior surfaces of the walls of the main container and its cover may be a porcelain enamel coating produced from any frit currently offered for sale by suppliers of such materials for use in the fabrication of conventional catalytic cleaning ovens sold for residential use. The specific catalytic coating used forms no part of this invention. Should a more effective catalytic coating be developed in the future than is now commercially available, it will be understood by those skilled in the art that this improved coating may result in a reduction in the minimum temperature required for substantially complete oxidation of accumulated waste materials on the interior surfaces of the barbecue grill of this invention.

Generally speaking, it is desirable to avoid any substantial contact of the flame jets with the main container walls of the grill because of possible damage to the catalytic coating. Even if a coating is developed at some later time that is impervious as a practical matter to very high temperatures such as might be caused by continued contact of the flame jets with the coating, it would be inefficient to use a flow rate that would bring the flame jets into contact with the main container walls, because any substantial increase in wall temperature at such isolated spots would not be translated (by conductance or any other mode of heat transfer) into uniform heat distribution across the wall surfaces. In addition, spotty heating resulting from contact of the flame jets with the container walls is likely to cause more heat to be lost by radiation outward from the walls of the grill than when the heating of the walls is more nearly uniform.

In addition to the factors already discussed, the desired flow rate may also be affected by the cross-sectional shape of the main container of the barbecue grill. Thus, a main container of curvilinear shape in which the main container walls have an outward flare as they rise from the vicinity of the gas burner may require a hotter flame (and thus a higher flow rate of cooking gas) in order to maintain the necessary oxidizing temperature, during the cleaning mode of operation, in locations that extend above the gas burner to the upper lip of the main container, which is perhaps the most difficult area for cleaning because of the heavy soiling that results there by reason of dripping or spattering from foodstuffs being cooked.

The location and alignment of the exit ports of the gas burner are also of importance. The exit ports should be evenly spaced around the perimeter of the burner, with adjacent exit ports separated by only relatively short distances, so as to produce a substantially even heating pattern around the burner adjacent the main container walls. It is best to align the exit ports of the gas burner so that they face outward in a horizontal plane and cause the flame jets from the ports to be initially horizontally directed as they leave the exit ports. Generally speaking, flame jets thus directed are the most effective for heating the main container walls during the cleaning mode of operation for grills of various shapes.

In particular, with grills in which the main container is of approximately hemispherical shape, it has been found that horizontally directed flames increase the heat at locations extending approximately two-thirds of the way down from the top of the main kettle, or in other words down to the vicinity of the gas burner. As indicated just above, these locations are probably the most difficult areas to be cleaned on the interior surfaces of the grill. An additional advantage of aligning the exit ports of the gas burner to direct the flame jets horizontally outward is that any dripping of grease or melted fat into the exit ports is thereby substantially avoided.

Main Combustion Chamber

As pointed out above, the volume and location of the portion of the barbecue grill that is defined as the "main combustion chamber" are critical parameters for the automatic cleaning gas barbecue grill of this invention. The volume of the main combustion chamber must fall within the limits explained above, and its location is determined by the required location of the center of gravity of the air within the main combustion chamber, as also explained above.

Presumably any barbecue grill that is sold commercially will have a regular geometric overall shape, whether it be rectilinear or curvilinear. This overall shape (whether regular or not), the vertical positioning of the gas burner, and the vertical positioning of the grate on which pieces of refractory material are supported will together determine the particular shape and volume of the main combustion chamber, and will also result in a particular location for the center of gravity of the air within the main combustion chamber.

The main container bottom wall has means extending therethrough for introducing a mixture of cooking gas and primary air into the gas burner within the interior of the main container, and a separate secondary air inlet opening. The outer portion of the gas burner and the walls of the main container define between them a passageway for air flow from the secondary air inlet opening upward around the burner and into the main combustion chamber. The cross-sectional area of this air flow passageway should be at least as large as the cross-sectional area of the secondary air inlet opening in the bottom wall, since the latter opening will be selected, in accordance with principles known in the prior art, to provide a sufficient volume of secondary air in relation to the predetermined rate of flow of cooking gas to produce efficient combustion during the cleaning mode of operation of the barbecue grill.

Positioning Of Pieces Of Refractory Material

The pieces of refractory material distributed across the grate on which they are supported act as a heat deflector to help distribute the heat more evenly throughout the grill, especially during the cleaning mode of operation. However, the pieces of refractory materials must not be positioned on the grate so compactly that too much heat deflection will occur. Nor must the pieces of refractory material approach the main container walls so closely that heat currents are not allowed to move freely upward at or around the grate edge to heat the main container walls in the portions thereof that lie between the grate and the upper lip of the main container, which as explained above is probably the most difficult area to clean.

For these two reasons, the pieces of refractory materials are distrubuted across the entire area of the grate in a manner that leaves (1) a gap between the outer peripheral edge of the bed of refractory materials and the interior surfaces of the grill side walls that is free of any such material extending substantially around the grate, either within or outside the perimeter thereof, and (2) a number of smaller gaps, preferably uniformly shaped and positioned, between the pieces of refractory material.

Positioning Of Cooking Grid

The distance the cooking grid is spaced above the grate and the pieces of refractory material supported thereon will be selected according to factors known to those skilled in the art.

The spacing should be such that it will (1) minimize random heat flare-ups, caused by non-uniformity of heat across the bed of refractory material, which would otherwise reach the foodstuffs being cooked, (2) provide adequate space for vaporization of juices and melted fats that may drop on the refractory material, (3) avoid overheating and scorching of the foodstuffs, (4) avoid permitting unburned cooking gas to reach the food being cooked, and (5) avoid permitting flames from the combustion of any cooking gas that may escape above the refractory material to reach the food on the cooking grid.

Exhaust Outlet Means

The exhaust outlet means for the barbecue grill of this invention may be located in the conventional position at the top of the cover for the grill, or around the upper lip of the main container between that lip and the grill cover, or in any other location in the upper part of the grill, as desired. If the upper lip of the main container lies in a slanting plane, so that some parts of the main container side walls are taller than other parts, the exhaust outlet means may, if desired, be defined by those taller side walls. But if the main container upper lip lies in a horizontal plane, the exhaust outlet means will usually be defined in one way or another by the grill cover when it is in place upon the main container.

The cross-sectional area of the exhaust outlet may be the same for both the principal cooking mode of operation and the automatic cleaning mode of operation of the grill. Or, since an exhaust outlet opening designed for the most efficient automatic cleaning will be too large for the most efficient retention of heat during the principal cooking mode, the exhaust opening may be constructed and arranged to be somewhat smaller, if desired, for the latter mode than for the former. In such case, the user of the grill must take care to shift to the larger opening whenever the grill is operated in its automatic cleaning mode, in order that an unsafe build-up of exhaust within the grill during the cleaning operation will be avoided. If it is desired to avoid this complication that follows from having two exhaust outlet settings, the inefficiency and slightly greater fuel consumption in the principal cooking mode resulting from use of the larger exhaust outlet that is designed for the automatic cleaning mode can, of course, be tolerated.

As indicated above, the cross-sectional area of the exhaust outlet opening must permit the escape of enough exhaust to avoid the accumulation of an unsafe level of carbon monoxide, but at the same time limit the escape of the exhaust somewhat in order to maintain the necessary waste material combustion temperature along the inner surfaces of the grill. Satisfactory, improved, and preferred results are obtained when the exhaust outlet cross-sectional area has the specific values set forth above. These cross-sectional areas for the exhaust outlet opening, expressed for every cubic foot of volume of the interior of the grill when the cover is in place upon the main container, are between about 3.04 sq. in. and about 3.45 sq. in. for satisfactory operation, between about 3.08 sq. in. and about 3.29 sq. in. for improved operation, and about 3.12 sq. in. for preferred results multiplied in each case by the conversion fraction specified above.

The indicated range for the exhaust outlet opening cross-sectional area of between about 3.04 sq. in. and about 3.45 sq. in. for each cubic foot of total volume of the interior of the covered grill; is found to produce a level of combustion efficiency represented by the presence of no more than about 0.08 percent of carbon monoxide in the gaseous contents of the grill in the vicinity of the exhaust outlet means. This level of carbon monoxide is the maximum permitted for gas barbecue grills by the regulations of the American National Standards Institute, Inc., as contained in ANSI Z21.58-1982, American National Standard for Outdoor Cooking Gas Appliances, Part II, Performance, Sections 2.1 through 2.15. The determination of the percent by volume of carbon monoxide that is present in the gaseous contents of the grill in the vicinity of the exhaust outlet means is made according to the method prescribed in Section 2.5 of the regulations of American National Standards Institute, Inc. just referred to.

The preferred value of about 3.12 sq. in, for every cubic foot of volume of the interior of the grill when the cover is in place upon the main container, produces a level of combustion efficiency represented by the presence of no more than about 0.003 percent of carbon monoxide in the gaseous contents of the grill in the vicinity of the exhaust outlet means, which is well below the maximum permitted by the regulations of the American National Standards Institute, Inc. The range of between about 3.08 and about 3.29 produces an intermediate level of combustion efficiency.

The specific numerical values just discussed are intended for a barbecue grill employing bottled propane as the fuel. If a different cooking gas is to be employed, the desired cross-sectional area of the exhaust outlet opening is adjusted by use of the conversion fraction defined above. The reasons for this particular conversion fraction will now be explained.

If the gas barbecue grill of this invention is constructed for use with a cooking gas that has a heating value different from that of propane, the flow rate for the automatic cleaning mode of operation with that gas will be a predetermined figure other than the flow rate that has been established experimentally with propane used as the fuel. This other predetermined flow rate is the first part of the numerator of the conversion fraction that is to be used in determining the specific exhaust outlet cross-sectional area. The second part is the minimum flow rate of primary and secondary air that is required for substantially complete combustion of the other cooking gas at the flow rate in question. This minimum flow rate of primary and secondary air can be measured, or it may be computed from tables well known to those skilled in the art, such as for example Table 45 (entitled "Products Of Combustion") that appears on page 4-55 of *Marks' Standard Handbook For Mechanical Engineers* (Eighth Ed., 1978). Both the flow rates that are added together to form the numerator of this conversion fraction are expressed in cubic feet per minute.

The denominator—5.9 c.f.m.—of the defined conversion fraction was computed by (1) selecting a typical propane flow rate for the automatic cleaning mode of operation of the barbecue grill of this invention, (2) calculating (by means of Table 45 referred to above) the flow rate of air (both primary and secondary) that is necessary for the substantially complete combustion of that amount of propane at a typical temperature and at one atmosphere's pressure, and (3) adding the two flow rates.

As pointed out above, if a frit that contains a more effective oxidizing catalyst than is currently commercially available is developed in the future, this might reduce the minimum temperature that is required for the substantially complete oxidation of accumulated waste materials on the interior surfaces of the grill of this invention. The flow rate of cooking gas required to maintain this minimum temperature in the automatic cleaning mode of operation of the grill would as a result be reduced.

There may be other design factors affecting the efficiency of the operation of the grill that will also influence the required flow rate of cooking gas in the automatic cleaning mode. However, with frits similar to those currently available and with such other design factors, if any, being equal, when the barbecue grill of this invention is designed for use with propane as the cooking gas, no conversion of the exhaust outlet cross-sectional area should be required since the figures specified above for that area should be applicable to the grill in question. This situation will be reflected in the fact that the defined "conversion fraction" can then be expected to turn out to be about 1.0, because the numerator and the denominator of the fraction should be approximately the same figures.

Both the volumes of the primary air and the secondary air that are introduced into the grill, and the volume of the exhaust exiting from the grill, will be influenced to an extent by the ambient conditions under which the grill is actually used. It is believed that these effects will in practice substantially cancel out. The exhaust outlet opening defined by the specific numerical figures given above in this specification is designed for typical ambient conditions, including temperature, atmospheric pressure, wind conditions, and degree of shelter provided by the location in the backyard or on the patio where the grill is likely to be used.

The cooking gas used with a gas barbecue grill may include only pure hydrocarbons, or it may include carbon monoxide or other flammable gases as well. The combustion mixture introduced into the grill from the gas burner exit ports will include, of course, a volume of air that is made up essentially of approximately 20 percent oxygen, approximately 80 percent nitrogen and other inert gases, and a certain amount of carbon dioxide and water vapor. Further air having substantially the same composition is added in the main combustion chamber from the secondary air that enters the grill through the secondary air inlet opening in the bottom wall of the grill. Assuming a high level of efficiency in the combustion process, the exhaust from the grill includes substantially increased quantities of carbon dioxide and water vapor, traces of carbon monoxide, traces of unburned hydrocarbons, some quantity of unused oxygen, and of course the original volume of nitrogen and other inert gases.

Although the chemical composition of various cooking gases differs, and therefore the exact mixture of combustion products produced from the burning of the gases will differ, it is believed that the volume of the exhaust from the burning of a given volume of any commonly used fuel gases that exits from the grill will, within reasonable limits, be substantially the same. Thus, the defined conversion fraction specified above for determination of the desired size of the exhaust outlet opening does not take into account the volume of exhaust as it is affected by the nature of the particular combustion products formed, but only as it is affected by the volume of the particular type of cooking gas, and the volumes of primary and secondary air required for efficient combustion of that volume of cooking gas, that are introduced into the grill.

BRIEF DESCRIPTION OF DRAWINGS

The invention will now be described by reference to the accompanying drawings, in which:

FIG. 2 is a plan view of the grate of the barbecue grill of FIG. 1, with a plurality of pieces of a refractory material distributed across the grate;

FIG. 3 is a somewhat reduced sectional view taken along the line 3—3 in FIG. 1;

FIG. 4 is an enlarged, fragmentary sectional view of the grill of FIG. 1, showing the gas barbecue grill in its cooking mode of operation;

FIG. 5 is a somewhat reduced sectional view of the barbecue grill of FIG. 1 taken along the same line in that Figure as in FIG. 3, showing the barbecue grill in its cooking mode of operation; and FIG. 6 is an enlarged, fragmentary sectional view of the cover of the gas barbecue grill of FIG. 1 in place upon the main container of the barbecue grill in the cooking mode of operation of the grill.

DETAILED DESCRIPTION OF ONE EMBODIMENT

Figure 1:
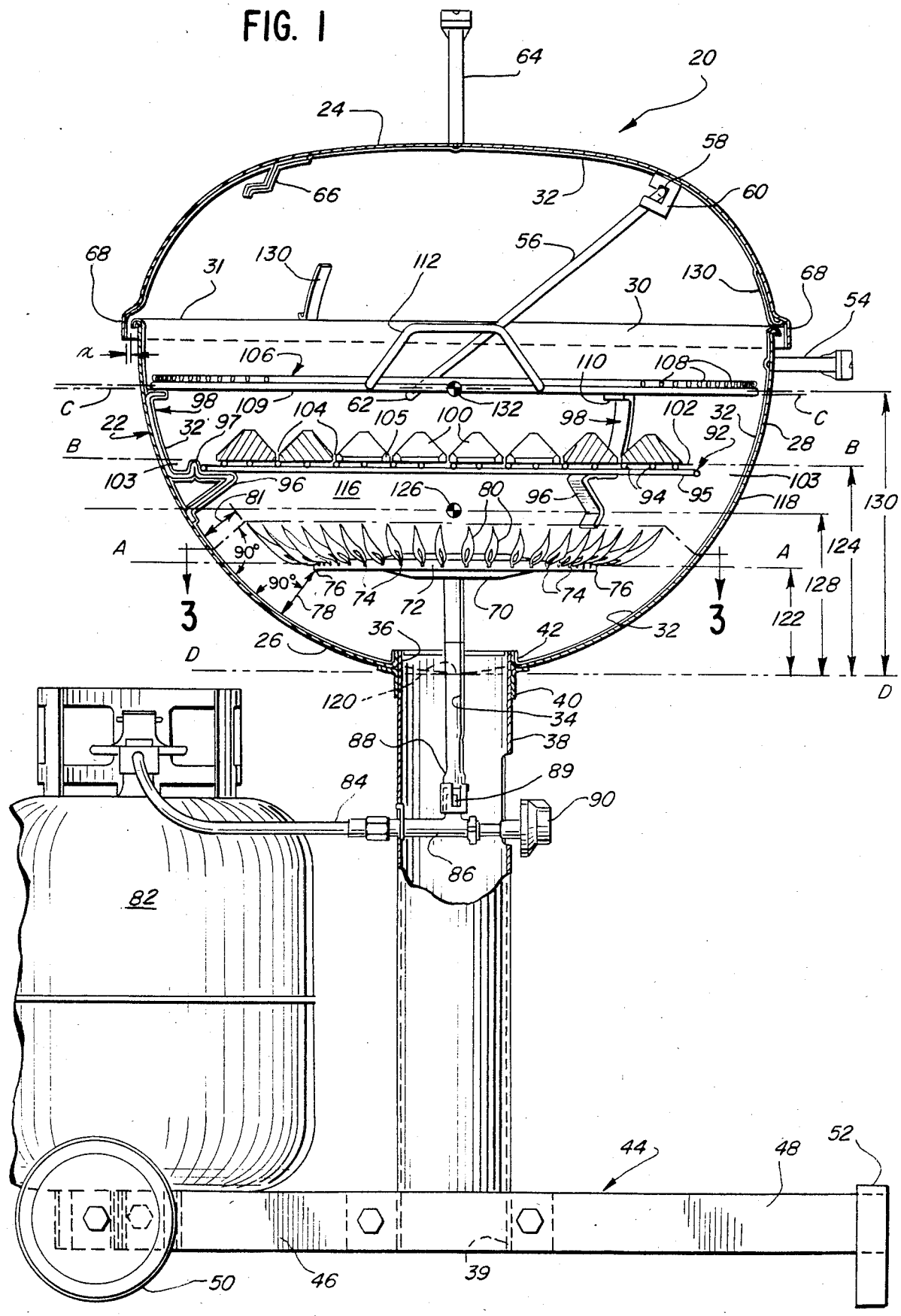
FIG. 1 is a vertical sectional view through the center of one embodiment of the gas barbecue grill of this invention in its automatic cleaning mode of operation.

The following is a detailed description of one embodiment of the automatic cleaning gas barbecue grill of this invention.

Main Container

FIG. 1 is a sectional view, taken through the center of the grill, of one embodiment 20 of the barbecue grill of this invention. The space enclosed within grill 20, which is curvilinear in vertical cross-section, is defined in part by hemispherical main container 22, formed of bottom wall 26 and side walls 28. Side walls 28 terminate in upwardly facing opening 30 at the upper lip 31 of the main container.

The interior surfaces of bottom wall 26 and side walls 28 of main container 22 are coated with a coating 32 that includes an oxidizing catalyst of a conventional type employed for automatic cleaning ovens.

Main container bottom wall 26 has tube 34 extending therethrough for introducing a mixture of cooking gas and, primary air into gas burner 70 located in the interior of the grill. A separate secondary air inlet opening 36, defined by the upper end of hollow pedestal 38, surrounds tube 34 at the center of the bottom wall. The bottom end 39 of pedestal 38 is open to the surrounding air.

Pedestal 38 is secured to main container 22 by collar 40, and forms a tight fit with upwardly extending flange 42 in bottom wall 26. Flange or ring 42 forms a grease trap at the bottom of main container 22, which trap is drained through a drain hole (not shown) adjacent flange 42.

Main container 22 is supported as just described at the top of pedestal 38, which is in turn carried by bottom frame 44. Frame 44 is generally Y-shaped, with two legs 46 extending to the left of FIG. 1 and a single leg 48 extending to the right. Each leg 46 carries a wheel 50, and leg 48 carries stop 52, to give barbecue grill 20 stable three-point support. This construction permits the user of the grill to roll it about by lifting up on handle 54 attached to side wall 28 near upper lip 31 of the main container, just as in conventional gas barbecue grills.

Cover

Cover 24 is ellipsoid in shape, and is approximately one-half as deep as hemispherical main container 22. Like the main container, its interior surface is coated with a coating 32 that includes an oxidizing catalyst of a conventional type.

Cover 24 is removably attached to main container 22 through hinge 56. Hinge 56 is pivotally and detachably received at its upper end 58 in bracket 60, which is secured to the underside of cover 24. It is pivotally journaled at its lower end 62 in side wall 28 of main container 22.

When cover 24 is lifted off the main container and rotated on hinge 56 (as by lifting up on handle 64 in the center of the top of the cover), the cover can be secured in an open position by bringing spring clip 66, which is secured to the underside of cover 24 generally opposite bracket 60, into engagement with upper lip 31 of main container 22 at the left-hand side of FIG. 1.

The surfaces of spring clip 66, like the interior surfaces of main container 22 and cover 24, are coated with a coating that includes an oxidizing catalyst.

Unlike most conventional gas barbecue grills, cover 24 of embodiment 20, as seen in FIG. 1, does not have an exhaust outlet opening in its upper portion. In the embodiment illustrated, the exhaust outlet opening, as will be explained below, is formed by the positioning of outwardly and downwardly extending flange 68, at the bottom of cover 24, over upwardly facing lip 31 on main container 22. However, the exhaust outlet means for the automatic cleaning gas barbecue grill of this invention may, if desired, be positioned in the conventional location in the top portion of cover 24, or be otherwise defined by cover 24 or by main container 22, so long as the size of the opening meets the limitations that are discussed above as a part of the definition of this grill.

Gas Burner

Gas burner 70, located in the bottom portion of main container 22, forms a gas plenum of generally disk-like shape. The gas burner has top, bottom and side walls. In the embodiment disclosed, side wall 72 of gas burner 70 defines a plurality of spaced exit ports 74 passing through said wall, which ports are located around the burner in outer portion 36 of the burner.

Outer peripheral portion 76 of gas burner 70 and bottom wall 26 of main container 22 define between them a passageway for air flow from secondary air inlet 36 upward around the burner. The cross-sectional area of this air flow passageway is represented by a frusto-conical shape that has an upper diameter equal to the outer diameter of burner 70, a somewhat larger lower diameter, and a vertically slanting element whose length is determined by spacing 78, measured along the line normal to bottom wall 26, between the wall and the burner. This cross-sectional area must be at least as large as the cross-sectional area of secondary air inlet 36 surrounding primary air inlet 34 in main container bottom wall 26.

Exit ports 74 are aligned to direct flame jets 80 initially in an outward horizontal direction from burner 70. The diameter of gas burner 70 and the size and spacing of exit ports 74 is determined in the manner described above in the section on Method Of Design Of Grill Of This Invention.

Flame jets 80 are shown in FIG. 1 in the approximate size and shape they have during the automatic cleaning mode of operation of the grill. In the condition shown, the flame jets that project from the burner exit ports with the aforementioned higher rate of flow of the given type of cooking gas during the automatic cleaning mode of operation of the grill come on the average to within less than about two inches from the nearest main container wall, measured along a line normal to said wall. This distance is designated by the numeral 81 in FIG. 1.

FIG. 3 is a somewhat reduced sectional view taken along the line 3—3 in FIG. 1, which shows how flame jets 80 extend outward from outer portion 76 of gas burner 70 during the automatic cleaning mode of operation of grill 20. As will be explained below, a mixture of cooking gas and primary air is directed outward from exit ports 74 of burner 70.

FIG. 4 is an enlarged, fragmentary sectional view of the grill of FIG. 1, showing the gas barbecue grill in its cooking mode of operation. In this mode, flame jets 80 do not extend outward from exit ports 74 of gas burner 70 as far as in the automatic cleaning mode, since the temperature at which cooking is carried out is considerably below the principal temperature at which automatic cleaning proceeds, and therefore the gas flow rate is considerably lower than in the automatic cleaning mode.

FIG. 5 is a somewhat reduced sectional view of the barbecue grill of FIG. 1 taken along the same line in FIG. 1 as is FIG. 3, but showing the barbecue grill in its principal cooking mode of operation. In other words, flame jets 80 are directed outward from exit ports 74 of burner 70 in the same manner as they are shown in FIG. 4 in elevation.

As seen in FIG. 1, gas burner horizontal positioning plane A—A cuts substantially through the geometric centers of exit ports 74 on gas burner 70. The vertical positioning of plane A—A will be described below in connection with the discussion of the main combustion chamber of this barbecue grill.

Cooking Gas

Tank 82, carried by frame 44, provides a source of cooking gas for grill 22. Feed line 84 connects source 82, through valve 86, with venturi tube 88, where primary air that has risen through hollow pedestal 38 from its open bottom end 39, and has passed through shuttered valve 89 into the venturi, is mixed with cooking gas to form a mixture that is introduced into gas burner 70 through primary air inlet opening 34. The capacity of valve 86 to pass cooking gas is determined by the position of control knob 90, which can be turned by the user of the grill to select whichever mode of operation of the grill is desired.

Control knob 90 has at least two 37 ON" positions, and frequently more. One position allows a first predetermined rate of flow of propane for the cooking mode of operation of the grill. If desired, there may be additional knob positions for the cooking mode, as for example when low, medium and high cooking temperatures are provided. Another knob position allows at least one higher rate of flow of propane for the automatic cleaning mode of operation of the grill.

The flow rates for the respective settings of control knob 90 are determined as explained above in this specification.

Refractory Material

Grate 92, formed of an array of parallel wires 94 supported on circular wire 95, is positioned above gas burner 70 within the interior of grill 20. It rests upon lower ends 96 of three supporting brackets 98, which are spaced evenly around main container side walls 28 and secured to the inner surfaces of the same. Each bracket lower end 96 includes stop means 97 which cooperates with similar stop means on the other lower ends 96 to confine grate 92 with its outer perimeter spaced from side walls 28 of main container 22. The surfaces of supporting brackets 98, like the interior surfaces of main container 22 and cover 24, are coated with a coating that includes an oxidizing catalyst.

In the embodiment illustrated, pieces of refractory material 100 in the general form of four-sided pyramidal briquettes are distributed across the entire area of grate 92, in a manner such that a gap that is free of any refractory material extends substantially around the grate. As best seen in FIGS. 1 and 2, this gap in the embodiment illustrated includes both gap 102 within the perimeter of grate 92 and larger gap 103 outside the perimeter of the grate.

Either a gap within the perimeter of the grate, a gap outside that perimeter, or both (as in the embodiment shown) must be present. If a grate having a diameter of a size that brings its outer perimeter closer to main container side walls 28 than is the case in the grill of FIGS. 1 and 2 is employed, the area of gap 102 will have to be increased.

In addition to gaps 102 and 103, a plurality of smaller gaps 104 and 105 is positioned between individual briquettes 100 (again, as best seen in FIG. 2). Gaps 104 are narrow, elongated spaces of substantially uniform width between adjacent briquettes. Gaps 105 are square or triangular spaces located at the junction of four or two corners, respectively, of adjacent briquettes. The purpose of gaps 102, 103, 104 and 105 is as described above.

The grate supporting briquettes 100 has a top surface (defined by the top surfaces of individual parallel wires 94) that lies in horizontal plane B—B. As will be explained below, plane B—B helps to define the main combustion chamber of grill 20.

Cooking Grid

Cooking grid 106, which supports foodstuffs above burner 70 within grill 20, is formed of an array of parallel wires 108 secured to circular support wire 109. The grid rests upon upper ends 110 of supporting brackets 98. It can be removed from this operative position, when desired, by means of wire handles 112 on either side of the grid.

Grid 106 has a bottom surface located in horizontal plane C—C. The distance that plane C—C is spaced above horizontal plane B—B, in which the top surface of grate 92 carrying pieces of refractory material 100 is located, is determined by considerations already discussed above.

Main Combustion Chamber

As pointed out above, the volume and location of main combustion chamber 116 is a critical part of this invention. Main combustion chamber 116 is defined (1) at the bottom, by gas burner horizontal positioning plane A—A, which cuts substantially through the geometric centers of gas burner exit ports 74, (2) at the top, by horizontal plane B—B, in which the top surface of grate 92 is located, and (3) at the sides, by portions 118 of side walls 28 of main container 22. Side walls 28 are defined as extending from upwardly facing opening 30 at upper lip 31 of main container 22 downward at least as far as burner positioning plane A—A.

As used in this specification and the appended claims, the term "lowest point" on the bottom wall of the main container of the barbecue grill of this invention refers to the lowest point, when the grill is standing upright in position for use in cooking, on the hypothetical surface that is an extension of the actual bottom wall of the main container into the area occupied by the primary and secondary air inlet openings. Horizontal plane D—D is tangent to the hypothetical center portion of bottom wall 26 at its lowest point 120.

As will be seen, three factors give a direct determination of both the volume and the vertical location of main combustion chamber 116 in the barbecue grill illustrated. These three factors are (1) vertical distance 122 from lowest point 120 (in plane D—D) to gas burner horizontal positioning plane A—A, (2) vertical distance 124 from lowest point 120 to horizontal plane B—B at the top of grate 92, and (3) the shape and dimensions of main container side wall portions 118.

As has been explained, the volume of main combustion chamber 120 must fall in a range between about 10 percent and about 28 percent of the total volume of the interior of grill 20 when cover 24 is in place upon main container 22. Improved results are obtained if this percentage is between about 13 percent and about 24 percent. In the embodiment illustrated, the volume of the main combustion chamber is the preferred figure of about 17 percent of the total volume of the interior of grill 20.

Center Of Gravity Method of Defining Location Of Main Combustion Chamber

The three factors mentioned just above as determining the volume and location of the main combustion chamber also fix indirectly the location of center of gravity 126 of the air within the main combustion chamber. It follows from this fact that once the overall size and shape of the barbecue grill that is to be employed in the practice of the present invention has been determined, the volume and location of the main combustion chamber may be specified, if desired, simply by specifying the location of the center of gravity of the air within that chamber.

Center of gravity 126 is located at a level spaced above lowest point 120 on the interior surface of bottom wall 26 of main container 22 by vertical distance 128. As explained above in this specification, this vertical distance must fall in a range between about 48 percent and about 62 percent of the vertical distance 130 that center of gravity 132 of the air enclosed by main container 22 and its cover 24 is spaced above lowest point 120. Improved results are obtained if this range of percentages is between about 51 percent and 59 percent, and the preferred value is about 55 percent. In the embodiment illustrated, vertical distance 128 is about 57 percent of vertical distance 130.

The definition of the volume and location of the main combustion chamber of the barbecue grill of this invention by this center of gravity method is not as direct as the method of specifying the location of the upper and lower boundary planes of that chamber (discussed in the next section), but it is more broadly applicable regardless of the over-all shape of the particular barbecue grill being designed.

Definition Of Main Combustion Chamber By Location Of Boundary Planes In Grill Of Particular Shape And Size Control of the volume and location of the main combustion chamber in the practice of the present invention can of course be achieved directly through control of: (1) the vertical distance that the horizontal positioning plane of the gas burner is spaced above the lowest point on the interior surface of the bottom wall of the main container, and (2) the vertical distance that the plane of the top surface of the grate supporting the pieces of refractory material lies above the lowest point on the interior surface of the bottom wall of the main container. As has been pointed out above, the parameters just described, together with the shape and dimensions of the main container side wall portions lying between the two planes referred to, directly fix the volume and location of the main combustion chamber of the grill.

The particular barbecue grill employed in the research that led to the invention disclosed herein was a conventional kettle-shaped grill such as shown in FIG. 1 of the drawing, which has a generally hemispherical main container and an ellipsoid cover for the main container, the cover being approximately one-half as deep as the main container. With a grill of such a shape, satisfactory results are obtained when (1) the volume of main combustion chamber 116 is in a range between about 10 percent and about 28 percent of the total volume of the interior of the grill when the cover is in place upon the main container, (2) gas burner horizontal positioning plane A—A is spaced at a vertical distance 122 above the lowest point 120 on the interior surface of bottom wall 26 of main container 22 that is in a range between about 29 percent and about 42 percent of the vertical distance 130 that the center of gravity 132 of the air enclosed by the main container and its cover is spaced above lowest point 120, and (3) horizontal plane B—B in which the top surface of grate 92 lies is spaced at a vertical distance 124 above lowest point 120 that is in a range between about 59 percent and about 85 percent of the vertical distance 130 that center of gravity 132 of the air enclosed by the main container and its cover lies above that lowest point.

Improved results are obtained if the range of percentages for main combustion chamber volume 116 is between about 13 percent and about 24 percent, the range of percentages for the location of gas burner positioning plane A—A is between about 34 percent and about 40 percent, and the range of percentages for the location of plane B—B in which the top surface of grate 92 lies is between about 64 percent and about 80 percent.

Preferred results are obtained with a gas barbecue grill of the indicated shape if the volume of main combustion chamber 116 is about 17 percent of the total volume of the interior of the grill, gas burner horizontal positioning plane A—A is spaced at a vertical distance 122 above the lowest point 120 on the interior surface of the main container bottom wall 26 that is about 37 percent of the vertical distance 130 that center of gravity 132 of the air enclosed by the main container and its cover is spaced above lowest point 120, and horizontal plane B—B in which the top surface of grate 92 lies is spaced at a vertical distance 124 above lowest point 120 that is about 70 percent of the vertical distance 130 of center of gravity 132 of the air enclosed by the grill above that lowest point.

In each case, the main combustion chamber volume and the vertical distances of the two planes referred to should preferably be selected from the generally similar positions within the applicable ranges of volume or vertical distance.

Exhaust Outlet

In the embodiment disclosed in FIG. 1, cover 24 is supported by three spacer brackets 130 so as to be held a short distance above upper lip 31 of main container 22. Brackets 130 are secured to the interior surface of cover 24, positioned at equal angular distances around the circumference of the bottom of the cover. The surfaces of spacer brackets 130, like the surfaces of support brackets 98, are coated with a coating containing an oxidation catalyst.

Outwardly and downwardly extending flange 68 at the bottom of cover 24 forms an exhaust outlet opening with upper lip 31. As seen in the upper left-hand portion of FIG. 1, flange 68 is separated by a distance "x" from lip 31. This defines a cross-sectional area for the exhaust outlet opening that can be represented by an annulus with an inner diameter equal to the outer diameter of lip 31 of upwardly facing aperture 30, and an outer diameter that is larger than the inner diameter by an amount equal to 2 times "x." The magnitude of the cross-sectional area thus defined is determined as described above in this specification.

FIG. 6 gives an enlarged, fragmentary sectional view of cover 24 positioned above lip 31 of main container 22 in the principal cooking mode of operation of grill 20, when it is desired to provide a smaller exhaust outlet during that mode than in the automatic cleaning mode of operation. As is seen in this Figure, at the point where flange 68 of cover 24 lies closest to upper lip 31, the two members are separated by a distance "y," measured along a line perpendicular to the interior surface of flange 68, that is shorter than the distance "x" that defines the cross-sectional area of the exhaust outlet opening for the automatic cleaning mode of operation of the grill. Distance "y" thus provides an exhaust outlet with a cross-sectional area —represented by a frusto-conical shape whose vertically slanting element is the line "y"—that is substantially smaller than the cross-sectional area of the exhaust outlet opening in the automatic cleaning mode.

Comparison With Prior Art Grills

As already pointed out above, so far as applicant is aware, none of the specific features that together define the automatic cleaning gas barbecue grill of this invention —with the single exception of the manner of distribution of a plurality of pieces of refractory material across the grate upon which they are supported —has been present, even accidentally, in prior art barbecue grills. After the present invention was made, this conclusion was confirmed, insofar as the volume of the main combustion chamber is concerned, by direct observation of a number of commercially available barbecue grills.

These observations were made mathematically with respect to two kettle-shaped grills —the gas barbecue grill sold by UNR Industries, Inc. under the trademark THE HAPPY COOKER, and the gas barbecue grill sold by Weber-Stephen Products Co. under the trademark WEBER. They were made on a group of grills of various other shapes by a technique involving the filling of the grill with water in certain specified ways, and the weighing of the quantities of water required to fill the grill in the ways specified, which technique will now be discussed. A. Total Volume Of Grill The total volume of the interior of the barbecue grill when the cover is in place upon the main container can be determined for grills of any size and shape by the following method:

1. Fill all apertures in the main container walls with a malleable substance, such as clay, in such a way as to conform to the general geometric shape of the grill.
2. Completely fill the main container with water.

3. Remove and weigh the quantity of water required to fill the main container in step 2.*
*All weights expressed in pounds.

4. Divide the resulting weight in pounds by 62.4 lbs./cu. ft., to obtain the volume of the main container.

5. Invert the grill cover (with any apertures that are present closed up as described in step 1 above), and fill the inverted cover with water to the level that coincides with the plane of the upwardly facing opening in the main container when the grill is in use with the cover in place upon the main container.

6. Remove the quantity of water required to fill the inverted grill cover to the level specified in step 5, and weigh the same.

7. Divide the resulting weight by 62.4 lbs./cu. ft. to obtain the volume of the cover.

8. Add the two volumes obtained in steps 4 and 7 to obtain the total volume of the barbecue grill. B. Volume Of Main Combustion Chamber The volume of the main combustion chamber can be determined by the following method:

1. Fill the main container with water to the level of the horizontal plane in which the top surface of the grate upon which pieces of refractory material are supported lies.

2. Remove the water, weigh it, and compute its volume as in procedure A.

3. Refill the main container with water, this time to the level of the horizontal positioning plane that cuts substantially through the geometric centers of the exit ports disposed around the burner.

4. Remove the water, weigh it, and compute its volume as in procedure A.

5. Subtract the volume determined in step 4 from the volume determined in step 2, to obtain the volume of the main combustion chamber.

Prior Art Grills

To compare the construction of a number of commercially available gas barbecue grills with the construction of the automatic cleaning gas barbecue grill of the present invention, procedures A and B just described were used for the first five of the following grills, and direct measurement and mathmatical computation were used for the remaining grills:

| Manufacturer | Brand Name Or Model No. | Cooking Grid Area (sq. ins.) |
|---|---|---|
| (1) Bradley | GG919MSP | 303 |
| (2) Ducane | Trophy 2000 | 306 |
| (3) Jacuzzi | JC 4020 LPS | 342 |
| (4) Structo | 7993 | 290 |
| (5) Turco | 8807 | 343 |
| (6) UNR Industries, Inc. | THE HAPPY COOKER HCG 2281 | 363 |
| (7) Weber, with burner adjusted for indirect firing | WEBER 211101 | 363 |
| (8) Same grill, with burner adjusted for direct firing | WEBER 211101 | 363 |

The results of these comparisons are shown in the following table of the main combustion chamber volume of each grill expressed as a percentage of the total volume of the grill:

| (1) | (2) | (3) | (4) | (5) | (6)* | (7)* | (8)* | Grill Of Present Invention |
|---|---|---|---|---|---|---|---|---|
| 9.7 | 9.3 | 1.7 | 4.8 | 6.2 | 7.5 | 2.4 | 3.8 | 10–28** |

*Main container is generally hemispherical in shape; cover is ellipsoid in shape and approximately one-half as deep as the main container.
**Broadest range.

It is to be noted that in only two instances do the percentage volumes measured for prior art grills —one of the critically important parameters by means of which the grill of this invention is defined —even approach the value for that parameter in this invention.

Should further examination disclose that some isolated structural feature (or features) of the automatic cleaning gas barbecue grill of the present invention has been accidentally included in a prior art grill, it is believed it will be apparent that neither the significance of the individual features nor the necessity of combining all the features in question has been understood by prior workers in this field.

The above detailed description of this invention has been given for ease of understanding only. No unnecessary limitations should be understood therefrom, as modifications will be obvious to those skilled in the art.

I claim:

1. A gas barbecue grill which burns at least one type of cooking gas introduced therein from a souce of such fuel and has interior surfaces that are automatically cleaned when heated to a predetermined elevated temperature above the principal cooking temperatures of said gas barbecue grill, which comprises:

(a) a main container having an interior defined by a bottom wall and by side walls, said side walls terminating in an upwardly facing opening, the walls of said main container having interior surfaces that are coated with a coating that includes an oxidizing catalyst, said main container bottom wall having a secondary air inlet opening;

(b) a main container cover for said main container, the interior surface of said cover being coated with a coating that includes an oxidizing catalyst;

(c) a gas burner positioned in said main container, said burner having top, bottom and side walls, and having an outer peripheral portion, said walls of said gas burner defining a plurality of exit ports passing through said walls, said ports being located in said outer peripheral portion of the burner, said burner having a horizontal positioning plane that cuts substantially through the geometric centers of said exit ports, said main container side walls extending downward from said upwardly facing opening of the main container at least to said positioning plane, said outer peripheral portion of the burner and said main container walls defining between them a passageway for air flow from said secondary air inlet opening upward around said burner, the cross-sectional area of said air flow passageway being at least as large as the cross-sectional area of said secondary air inlet opening in the bottom wall of said main container;

(d) valve means for controlling the gas flow rate from said cooking gas source, said valve means providing:

(i) at least one predetermined rate of flow of a given type of cooking gas for the principal cooking mode of operation of said grill, and (ii) at least one predetermined higher rate of flow of said given type of cooking gas for an automatic cleaning mode of operation of the grill, in which mode:

the temperature along the interior surfaces of said main container walls and of said cover is maintained, at substantially all points along said surfaces, at a level at least high enough to cause substantially complete oxidation of small particles of charred foodstuffs, and fats, oils and sauces employed in cooking, that accumulate as waste materials on said interior surfaces during ordinary use, the temperature of the exterior surfaces said main container walls and of said cover does not rise above an acceptable level, and the tips of the flame jets that project from said burner exit ports extend to locations adjacent said main container walls without damaging said coating on the interior surfaces of the walls;

(e) means for operatively connecting said cooking gas source and said valve means;

(f) means for mixing cooking gas from said gas source with primary air from outside said barbecue grill;

(g) means extending through said main container bottom wall for introducing said mixture of cooking gas and primary air into said gas burner in the interior of said main container;

(h) a grate to support a plurality of pieces of a refractory material, said pieces of refractory material being formed in a bed with an outer peripheral edge when positioned on said grate, a gap being formed between said outer peripheral edge and the interior surfaces of said side walls, with a plurality of smaller gaps between said pieces of refractory material, said grate having a top surface which is located in a first horizontal plane above said gas burner; and (i) a cooking grid for supporting foodstuffs above said burner within the grill, said cooking grid having a bottom surface located in a second horizontal plane above said grate, said horizontal positioning plane of the gas burner, said main container side walls, and said first horizontal plane in which the top surface of said grate is located defining a main combustion chamber, the volume of said main combustion chamber being approximately 10 percent to 28 percent of the total volume of the interior of said gas barbecue grill when said cover is in place upon said main container, the center of gravity of the air within the volume defined by said main combustion chamber being at a level that is spaced above the lowest point on the interior surface of said bottom wall of the main container, when said gas barbecue grill is standing upright in position for use in cooking, by a vertical distance approximately 48 percent to 62 percent of the vertical distance between said lowest point on the bottom wall and the level of the center of gravity of the air within the volume defined by said main container and the main container cover when the container cover is in place upon the main container, said grill having exhaust outlet means, the ratio, for said automatic cleaning mode of operation of said grill, between the total cross-sectional area of said exhaust outlet means and the total volume enclosed by said main container and said main container cover when said cover is in place upon said main container being such as to permit the escape of the exhaust mixture resulting from the combustion of said cooking gas and to avoid the accumulation within the grill of carbon monoxide above safe levels, while limiting the escape of said exhaust mixture from said gas barbecue grill to maintain the necessary waste material combustion temperature along the inner surfaces of said main container walls and of said cover.

2. The automatic cleaning gas barbecue grill of claim 1 in which said exhaust outlet means for said automatic cleaning mode of operation of said grill has a total cross-sectional area, for every cubic foot of volume enclosed by said main container and said main container cover when the container cover is in place upon said main container, that is between about 3.04 square inches and about 3.45 square inches times a conversion fraction in which (a) the numerator is (i) said at least one higher flow rate of said given type of cooking gas provided by said valve means for said automatic cleaning mode of operation plus (ii) the minimum flow rate of primary and secondary air required for substantially complete combustion of said cooking gas at said at least one higher flow rate, both of said flow rates being expressed in cubic feet per minute, and (b) the denominator is 5.9 c.f.m.

3. The automatic cleaning gas barbecue grill of claim 2 in which said total cross-sectional area of the exhaust outlet means is between about 3.08 square inches and about 3.29 square inches for every cubic foot of volume enclosed by said main container and said main container cover when the container cover is in place upon said main container, times the fraction having the aforesaid numerator and denominator.

4. The automatic cleaning gas barbecue grill of claim 2 in which said total cross-sectional area of the exhaust outlet means is about 3.12 square inches, for every cubic foot of volume enclosed by said main container and said main container cover when the container cover is in place upon said main container, times the fraction having the aforesaid numerator and denominator.

5. The automatic cleaning gas barbecut grilll of claim 1 in which:

the volume of said main combustion chamber is approximately 13 percent to 24 percent of the total volume of the interior of said gas barbecue grill when said cover is in place upon said main container, and the center of gravity of the air within the volume defined by said main combustion chamber is at a level that is spaced above the lowest point on the interior surface of said bottom wall of the main container, when said gas barbecue grill is standing upright in position for use in cooking, by a vertical distance approximately 51 percent to 59 percent of the vertical distance between said lowest point on the bottom wall and the level of the center of gravity of the air within the volume defined by said main container and the main container cover when the container cover is in place upon the main container, 6. The automatic cleaning gas barbecue grill of claim 5 in which said exhaust outlet means for said automatic cleaning mode of operation of said grill has a total cross-sectional area, for every cubic foot of volume enclosed by said main container and said main container cover when the container cover is in place upon said main container, that is between about 3.04 square inches and about 3.45 square inches times a conversion fraction in which (a) the numerator is (i) said at least one higher flow rate of said given type of cooking gas provided by said valve means for said automatic cleaning mode of operation plus (ii) the minimum flow rate of primary and secondary air required for substantially complete combustion of said cooking gas at said at least one higher flow rate, both of said flow rates being expressed in cubic feet per minute, and (b) the denominator is 5.9 c.f.m.

7. The automatic cleaning gas barbecue grill of claim 6 in which said total cross-sectional area of the exhaust outlet means is between about 3.08 square inches and about 3.29 square inches, for every cubic foot of volume enclosed by said main container and said main container cover when the container cover is in place upon said main container, times the fraction having the aforesaid numerator and denominator.

8. The automatic cleaning gas barbecue grill of claim 6, in which said total cross-sectional area of the exhaust outlet means is about 3.12 square inches, for every cubic foot of volume enclosed by said main container and said main container cover when the container cover is in place upon said main container, times the fraction having the aforesaid numerator and denominator.

9. The automatic cleaning gas barbecue grill of claim 1 in which:
the volume of said main combustion chamber is about 17 percent of the total volume of the interior of said gas barbecue grill when said cover is in place upon said main container, and
the center of gravity of the air within the volume defined by said main combustion chamber is at a level that is spaced above the lowest point on the interior surface of said bottom wall of the main container, when said gas barbecue grill is standing upright in position for use in cooking, by a vertical distance approximately 55 percent of the vertical distance between said lowest point on the bottom wall and the level of the center of gravity of the air within the volume defined by said main container and the main container cover when the container cover is in place upon the main container.

10. The automatic cleaning gas barbecue grill of claim 12 in which said exhaust outlet means for said automatic cleaning mode of operation of said grill has a total cross-sectional area, for every cubic foot of volume enclosed by said main container and said main container cover when the container cover is in place upon said main container, that is between about 3.04 square inches and about 3.45 square inches times a conversion fraction in which (a) the numerator is (i) said at least one higher flow rate of said given type of cooking gas provided by said valve means for said automatic cleaning mode of operation plus (ii) the minimum flow rate of primary and secondary air required for substantially complete combustion of said cooking gas at said at least one higher flow rate, both of said flow rates being expressed in cubic feet per minute, and (b) the denominator is 5.9 c.f.m.

11. The automatic cleaning gas barbecue grill of claim 10 in which said total cross-sectional area of the exhaust outlet means is between about 3.08 square inches and about 3.29 square inches, for every cubic foot of volume enclosed by said main container and said main container cover when the container cover is in place upon said main container, times the fraction having the aforesaid numerator and denominator.

12. The automatic cleaning gas barbecue grill of claim 10 in which said total cross-sectional area of the exhaust outlet means is about 3.12 square inches, for every cubic foot of volume enclosed by said main container and said main container cover when the container cover is in place upon said main container, times the fraction having the aforesaid numerator and denominator.

13. The automatic cleaning gas barbecue grill of claim 1 in which said main container and said cover together enclose a space that is curvilinear in vertical cross-section.

14. The automatic cleaning gas barbecue grill of claim 13 in which said exhaust outlet means for said automatic cleaning mode of operation of the grill has a total cross-sectional area, for every cubic foot of volume enclosed by said main container and said main container cover when the container cover is in place upon said main container, that is between about 3.04 square inches and about 3.45 square inches times a conversion fraction in which (a) the numerator is (i) said at least one higher flow rate of said given type of cooking gas provided by said valve means for said automatic cleaning mode of operation plus (ii) the minimum flow rate of primary and secondary air required for substantially complete combustion of said cooking gas at said at least one higher flow rate, both of said flow rates being expressed in cubic feet per minute, and (b) the denominator is 5.9 c.f.m.

15. The automatic cleaning gas barbecue grill of claim 14 in which said total cross-sectional area of the exhaust outlet means is between about 3.08 square inches and about 3.29 square inches, for every cubic foot of volume enclosed by said main container and said main container cover when the container cover is in place upon said main container, times the fraction having the aforesaid numerator and denominator.

16. The automatic cleaning gas barbecue grill of claim 14 in which said total cross-sectional area of the exhaust outlet means is about 3.12 square inches, for every cubic foot of volume enclosed by said main container and said main container cover when the container cover is in place upon said main container, times the fraction having the aforesaid numerator and denominator.

17. The automatic cleaning gas barbecue grill of claim 13 in which:
the volume of said main combustion chamber is approximately 13 percent to 24 percent of the total volume of the interior of said gas barbecue grill when said cover is in place upon said main container, and
the center of gravity of the air within the volume defined by said main combustion chamber is at a level that is spaced above the lowest point on the interior surface of said bottom wall of the main container, when said gas barbecue grill is standing upright in position for use in cooking, by a vertical distance approximately 51 percent to 59 percent of the vertical distance between said lowest point on the bottom wall and the level of the center of gravity of the air within the volume defined by said main container and its cover when the container cover is in place upon the main container.

18. The automatic cleaning gas barbecue grill of claim 17 in which said exhaust outlet means for said automatic cleaning mode of operation of the grill has a total cross-sectional area, for every cubic foot of volume enclosed by said main container and said main container cover when the container cover is in place upon said main container, that is between about 3.04 square inches and about 3.45 square inches times a conversion fraction in which (a) the numerator is (i) said at least one higher flow rate of said given type of cooking gas provided by said valve means for said automatic cleaning mode of operation plus (ii) the minimum flow rate of primary and secondary air required for substantially complete combustion of said cooking gas at said at least one higher flow rate, both of said flow rates being expressed in cubic feet per minute, and (b) the denominator is 5.9 c.f.m.

19. The automatic cleaning gas barbecue grill of claim 18 in which said total cross-sectional area of the exhaust outlet means is between about 3.08 square inches and about 3.29 square incnes, for every cubic foot of volume enclosed by said main container and said main container cover when the container cover is in place upon said main container, times the fraction having the aforesaid numerator and denominator.

20. The automatic cleaning gas barbecue grill of claim 18 in which said total cross-sectional area of the exhaust outlet means is about 3.12 square inches, for every cubic foot of volume enclosed by said main container and said main container cover when the container cover is in place upon said main container, times the fraction having the aforesaid numerator and denominator.

21. The automatic cleaning gas barbecue grill of claim 13 in which:
the volume of said main combustion chamber is about 17 percent of the total volume of the interior of said gas barbecue grill when said cover is in place upon said main container, and
the center of gravity of the air within the volume defined by said main combustion chamber is at a level that is spaced above the lowest point on the interior surface of said bottom wall of the main container, when said barbecue grill is standing upright in position for use in cooking, by a vertical distance approximately 55 percent of the vertical distance that the center of gravity of the air within the volume defined by said main container and its cover when the container cover is in place upon the main container.

22. The automatic cleaning gas barbecue grill of claim 21 in which said exhaust outlet means for said automatic cleaning mode of operation of the grill has a total cross-sectional area, for every cubic foot of volume enclosed by said main container and said main container cover when the container cover is in place upon said main container, that is between about 3.04 square inches and about 3.45 square inches times a conversion fraction in which (a) the numerator is (i) said at least one higher flow rate of said given type of cooking gas provided by said valve means for said automatic cleaning mode of operation plus (ii) the minimum flow rate of primary and secondary air required for substantially complete combustion of said cooking gas at said at least one higher flow rate, both of said flow rates being expressed in cubic feet per minute, and (b) the denominator is 5.9 c.f.m.

23. The automatic cleaning gas barbecue grill of claim 22 in which said total cross-sectional area of the exhaust outlet means is between about 3.08 square inches and about 3.29 square inches, for every cubic foot of volume enclosed by said main container and said main container cover when the container cover is in place upon said main container, times the fraction having the aforesaid numerator and denominator.

24. The automatic cleaning gas barbecue grill of claim 22 in which said total cross-sectional area of the exhaust outlet means is about 3.12 square inches, for every cubic foot of volume enclosed by said main container and said main container cover when the container cover is in place upon said main container, times the fraction having the aforesaid numerator and denominator.

25. The automatic cleaning gas barbecue grill of claim 1 in which said main combustion chamber volume is selected from a position within the aforesaid about 10-28 percent range of numerical valves that corresponds generally to the position that said distance above the main container bottom of the center of gravity of the air within said main combustion chamber has within the aforesaid about 48-62 percent range of numerical valves.

26. The automatic cleaning gas barbacue grill of claim 13 in which said main combustion chamber volume is selected from a position within the aforesaid about 10-28 percent range of numerical valves that corresponds generally to the position that said distance above the main container bottom of the center of gravity of the air within said main combustion chamber has within the aforesaid about 48-62 percent range of numerical valves.

27. A gas barbecue grill which burns at least one type of cooking gas introduced therein from a source of such fuel and has interior surfaces that are automatically cleaned when heated to a predetermined elevated temperature above the principal cooking temperatures of said grill, which comprises:
(a) a generally hemispherical main container having an interior defined by a bottom wall and by side walls, said side walls terminating in an upwardly facing opening, the walls of said main container having interior surfaces that are coated with a coating that includes an oxidizing catalyst, said main container bottom wall having a secondary air inlet opening;
(b) an ellipsoid main container cover for said main container, the interior surface of said cover being coated with a coating that includes an oxidizing catalyst, said cover being approximately one-half as deep as said generally hemispherical main container;
(c) a gas burner positioned in said main container, said burner having top, bottom and side walls, and having an outer peripheral portion, said walls of said gas burner defining a plurality of exit ports passing through said walls, said ports being located in said outer peripheral portion of the burner,
said burner having a horizontal positioning plane that cuts substantially through the goemetric centers of said exit ports, said main container side walls extending downward from said upwardly facing opening of the main container at least to said positioning plane,
said outer peripheral portion of the burner and said main container walls defining between them a passageway for air flow from said secondary air inlet opening upward around said burner, the cross-sectional area of said air flow passageway being at least as large as the cross-sectional area of said secondary air inlet opening in the bottom wall of said main container;
(d) valve means for controlling the gas flow rate from said cooking gas source, said valve means providing:
(i) at least one predetermined rate of flow of a given type of cooking gas for the principal cooking mode of operation of said grill, and
(ii) at least one predetermined higher rate of flow of said given type of cooking gas for an automatic cleaning mode of operation of the grill, in which mode:
the temperature along the interior surfaces of said main container walls and of said cover is maintained, at substantially all points along said surfaces, at a level at least high enough to cause substantially complete oxidation of small particles of charred foodstuffs, and fats, oils and sauces employed in cooking, that accumulate as waste materials on said interior surfaces during ordinary use,
the temperature of the exterior surfaces of said main container walls and of said cover does not rise above an acceptable level, and
the tips of the flame jets that project from said burner exit ports extend to locations adjacent said main container walls without damaging said coating on the interior surfaces of the walls;
(e) means for operatively connecting said cooking gas source and said valve means;
(f) means for mixing cooking gas from said gas source with air from outside said barbecue grill;
(g) means extending through said main container bottom wall for introducing said mixture of cooking gas and primary air into said gas burner in the interior of said main container;
(h) a grate to support a plurality of pieces of a refractory material, said pieces of refractory material being formed in a bed with an outer peripheral edge when positioned on said grate, a gap being formed between said outer peripheral edge and the interior surfaces of said side walls, with a plurality of smaller gaps between said pieces of refractory material, said grate having a top surface which is located in a first horizontal plane above said gas burner; and
(i) a cooking grid for supporting foodstuffs above said burner within the grill, said cooking grid having a bottom surface located in a second horizontal plane above said grate,
said horizontal positioning plane of the gas burner, said main container side walls, and said first horizontal plane in which the top surface of said grate is located defining a main combustion chamber,
the volume of said main combustion chamber being approximately 10 percent to 28 percent of the total volume of the interior of said gas barbecue grill when said cover is in place upon said main container,
the center of gravity of the air within the volume defined by said main combustion chamber being at a level that is spaced above the lowest point on the interior surface of said bottom wall of the main container, when said gas barbecue grill is standing upright in position for use in cooking, by a vertical distance approximately 48 percent to 62 percent of the vertical distance between said lowest point on the bottom wall and the level of the center of gravity of the air within the volume defined by said main container and the main container cover when the container cover is in place upon the main container,
said grill having exhaust outlet means, the ratio, for said automatic cleaning mode of operation of said grill, between the total cross-sectional area of said exhaust outlet means and the total volume enclosed by said main container and said main container cover when said cover is in place upon said main container being such as to permit the escape of the exhaust mixture resulting from the combustion of said cooking gas and to avoid the accumulation within the grill of carbon monoxide above safe levels, while limiting the escape of said exhaust mixture from said gas barbecue grill to maintain the necessary waste material combustion temperature along the inner surfaces of said main container walls and of said cover.

28. The automatic cleaning gas barbecue grill of claim 27 in which said exhaust outlet means for said automatic cleaning mode of operation of the grill has a total cross-sectional area, for every cubic foot of volume enclosed by said main container and said main container cover when the container cover is in place upon said main container, that is between about 3.04 square inches and about 3.45 square inches times a conversion fraction in which (a) the numerator is (i) said at least one higher flow rate of said given type of cooking gas provided by said valve means for said automatic cleaning mode of operation plus (ii) the minimum flow rate of primary and secondary air required for substantially complete combustion of said cooking gas at said at least one higher flow rate, both of said flow rates being expressed in cubic feet per minute, and (b) the denominator is 5.9 c.f.m.

29. The automatic cleaning gas barbecue gril of claim 28 in which said total cross-sectional area of the exhaust outlet means is between about 3.08 square inches and about 3.29 square inches, for every cubic foot of volume enclosed by said main container and said main container cover when the container cover is in place upon said main container, times the fraction having the aforesaid numerator and denominator.

30. The automatic cleaning gas barbecue grill of claim 28 in which said total cross-sectional area of the exhaust outlet means is about 3.12 square inches, for every cubic foot of volume enclosed by said main container and said main container cover when the container cover is in place upon said main container, times the fraction having the aforesaid numerator and denominator.

31. The automatic cleaning gas barbecue grill of claim 27 in which:
the volume of said main combustion chamber is approximately 13 percent to 24 percent of the total volume of the interior of said gas barbecue grill when said cover is in place upon said main container, and
the center of gravity of the air within the volume defined by said main combustion chamber is at a level that is spaced above the lowest point on the interior surface of said bottom wall of the main container, when said gas barbecue grill is standing upright in position for use in cooking, by a vertical distance approximately 51 percent to 59 percent of the vertical distance between said lowest point on the bottom wall and the level of the center of gravity of the air within the volume defined by said main container and the main container cover when the container cover is in place upon the main container.

32. The automatic cleaning gas barbecue grill of claim 31 in which said exhaust outlet means for said automatic cleaning mode of operation of the grill has a total cross-sectional area, for every cubic foot of volume enclosed by said main container and said main container cover when the container cover is in place upon said main container, that is between about 3.04 square inches and about 3.45 square inches times a conversion fraction in which (a) the numerator is (i) said at least one higher flow rate of said given type of cooking gas provided by said valve means for said automatic cleaning mode of operation plus (ii) the minimum flow rate of primary and secondary air required for substantially complete combustion of said cooking gas at said at least one higher flow rate, both of said flow rates being expressed in cubic feet per minute, and (b) the denominator is 5.9 c.f.m.

33. The automatic cleaning gas barbecue grill of claim 32 in which said total cross-sectional area of the exhaust outlet means is between about 3.08 square inches and about 3.29 square inches, for every cubic foot of volume enclosed by said main container and said main container cover when the container cover is in place upon said main container, times the fraction having the aforesaid numerator and denominator.

34. The automatic cleaning gas barbecue grill of claim 32 in which said total cross-sectional area of the exhaust outlet means is about 3.12 square inches, for every cubic foot of volume enclosed by said main container and said main container cover when the container cover is in place upon said main container, times the fraction having the aforesaid numerator and denominator.

35. The automatic cleaning gas barbecue grill of claim 27 in which:
the volume of said main combustion chamber is about 17 percent of the total volume of the interior of said gas barbecue grill when said cover is in place upon said main container, and
the center of gravity of the air within the volume defined by said main combustion chamber is at a level that is spaced above the lowest point on the interior surface of said bottom wall of the main container, when said gas barbecue grill is standing upright in position for use in cooking, by a vertical distance approximately 55 percent of the vertical distance between said lowest point on the bottom wall and the level of the center of gravity of the air within the volume defined by said main container and its cover when the container cover is in place upon the main container.

36. The automatic cleaning gas barbecue grill of claim 35 in which said exhaust outlet means for said automatic cleaning mode of operation of said grill has a total cross-sectional area, for every cubic foot of volume enclosed by said main container and said main container cover when the container cover is in place upon said main container, that is between about 3.04 square inches and about 3.45 square inches times a conversion fraction in which (a) the numerator is (i) said at least one higher flow rate of said given type of cooking gas provided by said valve means for said automatic cleaning mode of operation plus (ii) the minimum flow rate of primary and secondary air required for substantially complete combustion of said cooking gas at said at least one higher flow rate, both of said flow rates being expressed in cubic feet per minute, and (b) the denominator is 5.9 c.f.m.

37. The automatic cleaning gas barbecue grill of claim 36 in which said total cross-sectional area of the exhaust outlet means is between about 3.08 square inches and about 3.29 square inches, for every cubic foot of volume enclosed by said main container and said main container cover when the container cover is in place upon said main container, times the fraction having the aforesaid numerator and denominator.

38. The automatic cleaning gas barbecue grill of claim 36 in which said total cross-sectional area of the exhaust outlet means is about 3.12 square inches, for every cubic foot of volume enclosed by said main container and said main container cover when the container cover is in place upon said main container, times the fraction having the aforesaid numerator and denominator.

39. The automatic cleaning gas barbecue grill of claim 27 in which said main combustion chamber volume is selected from a position within the aforesaid about 10-28 percent range of numerical valves that corresponds generally to the position that said distance above the main container bottom of the center of gravity of the air within said main combustion chamber has within the aforesaid about 48-62 percent range of numerical valves.

40. A gas barbecue grill which burns at least one type of cooking gas introduced therein from a source of such fuel and has interior surfaces that are automatically cleaned when heated to a predetermined elevated temperature above the principal cooking temperatures of said gas barbecue grill, which comprises:
(a) a generally hemispherical main container having an interior defined by a bottom wall and by side walls, said side walls terminating in an upwardly facing opening, the walls of said main container having interior surfaces that are coated with a coating that includes an oxidizing catalyst, said main container bottom wall having a secondary air inlet opening;
(b) an ellipsoid main container cover for said main container, the interior surface of said cover being coated with a coating that includes an oxidizing catalyst, said cover being approximately one-half as deep as said generally hemispherical main container;
(c) a gas burner positioned in said main container, said burner having top, bottom and side walls, and having an outer peripheral portion, said walls of said gas burner defining a plurality of exit ports passing through said walls, said ports being located in said outer peripheral portion of the burner,
said burner having a horizontal positioning plane that cuts substantially through the geometric centers of said exit ports, said main container side walls extending downward from said upwardly facing opening of the main container at least to said positioning plane,
said outer peripheral portion of the burner and said main container walls defining between them a passageway for air flow from said secondary air inlet opening upward around said burner, the cross-sectional area of said air flow passageway being at least as large as the cross-sectional area of said secondary air inlet opening in the bottom wall of said main container;
(d) valve means for controlling the gas flow rate from said cooking gas source, said valve means providing:

(i) at least one predetermined rate of flow of a given type of cooking gas for the principal cooking mode of operation of said grill, and (ii) at least one predetermined higher rate of flow of said given type of cooking gas for an automatic cleaning mode of operation of the grill, in which mode:

the temperature along the interior surfaces of said main container walls and of said cover is maintained, at substantially all points along said surfaces, at a level at least high enough to cause substantially complete oxidation of small particles of charred foodstuffs, and fats, oils and sauces employed in cooking, that accumulate as waste materials on said interior surfaces during ordinary use, the temperature of the exterior surfaces of said main container walls and of said cover does not rise above an acceptable level, and the tips of the flame jets that project from said burner exit ports extend to locations adjacent said main container walls without damaging said coating on the interior surfaces of the walls;

(e) means for operatively connecting said cooking gas source and said valve means;

(f) means for mixing cooking gas from said gas source with air from said primary air inlet opening;

(g) means extending through said main container bottom wall for introducing said mixture of cooking gas and primary air into said gas burner in the interior of said main container;

(h) a grate to support a plurality of pieces of a refractory material, said pieces of refractory material being formed in a bed with an outer peripheral edge when positioned on said grate, a gap being formed between said outer peripheral edge and the interior surfaces of said side walls, with a plurality of smaller gaps between said pieces of refractory material, said grate having a top surface which is located in a first horizontal plane above said gas burner; and (i) a cooking grid for supporting foodstuffs above said burner within the grill, said cooking grid having a bottom surface located in a second horizontal plane above said grate, said horizontal positioning plane of the gas burner, said main container side walls, and said first horizontal plane in which the top surface of said grate is located defining a main combustion chamber, the volume of said main combustion chamber being approximately 10 percent to 28 percent of the total volume of the interior of said gas barbecue grill when said cover is in place upon said main container, said gas burner horizontal positioning plane being spaced at a vertical distance above the lowest point on the interior surface of said bottom wall of the main contsiner, when said gas barbecue grill is standing upright in position for use in cooking, that is approximately 29 percent to 42 percent of the vertical distance between said lowest point on the bottom wall and the level of the center of the gravity of the air within the volume defined by said main container and the main container cover when the container cover is in place upon the main container, said horizontal plane of the top surface of said grate being spaced at a vertical distance above the lowest point on the interior surface of said bottom wall of the main container, when said gas barbecue grill is standing upright in position for use in cooking, said vertical distance being approximately 59 percent to 85 percent of said vertical distance of said center of gravity above said lowest point, said grill having exhaust outlet means, the ratio, for said automatic cleaning mode of operation of said grill, between the total cross-sectional area of said exhaust outlet means and the total volume enclosed by said main container and said main container cover when said cover is in place upon said main container being such as to permit the escape of the exhaust mixture resulting from the combustion of said cooking gas and to avoid the accumulation within the grill of carbon monoxide above safe levels, while limiting the escape of said exhaust mixture from said gas barbecue grill to maintain the necessary waste material combustion temperature along the inner surfaces of said main container walls and of said cover.

41. The automatic cleaning gas barbecue grill of claim 40 in which said range of percentages for the main combustion chamber volume is between about 13 percent and about 24 percent, said range of percentages for the location of said gas burner positioning plane is between about 34 percent and about 40 percent, and said range of percentages for the location of said top surface of the grate is between about 64 percent and about 80 percent.

42. The automatic cleaning gas barbecue grill of claim 40 in which:

the volume of said main combustion chamber is about 17 percent of the total volume of the interior of said gas barbecue grill when said cover is in place upon said main container, said gas burner horizontal positioning plane is spaced at a vertical distance above the lowest point on the interior surface of said bottom wall of the main containers when said gas barbecue grill is standing upright in position for use in cooking, that is about 37 percent of the vertical distance between said lowest point on the bottom wall and the level of the center of gravity of the air within the volume defined by said main container and the main container cover when the container cover is in place upon the main container, and said horizontal plane in which the top surface of said grate lies is spaced at a vertical distance above said lowest point on the interior surface of the bottom wall of the main container, when said gas barbecue grill is standing upright in position for use in cooking, said vertical distance being about 70 percent of said vertical distance of said center of gravity above said lowest point.

43. The automatic cleaning gas barbecue grill of claim 40 in which said exhaust outlet means for said automatic cleaning mode of operation of the grill has a total cross-sectional area, for every cubic foot of volume enclosed by said main container and said main container cover when the container cover is in place upon said main container, that is between about 3.04 square inches and about 3.45 square inches times a conversion fraction in which (a) the numerator is (i) said at least one higher flow rate of said given type of cooking gas provided by said valve means for said automatic cleaning mode of operation plus (ii) the minimum flow rate of primary and secondary air required for substantially complete combustion of said cooking gas at said at least one higher flow rate, both of said flow rates being expressed in cubic feet per minute, and (b) the denominator is 5.9 c.f.m.

44. The automatic cleaning gas barbecue grill of claim 48 in which said total cross-sectional area of the exhaust outlet means is between about 3.08 square inches and about 3.29 square inches, for every cubic foot of volume enclosed by said main container and said main container cover when the container cover is in place upon said main container, times the fraction having the aforesaid numerator and denominator.

45. The automatic cleaning gas barbecue grill of claim 43 in which said total cross-sectional area of the exhaust outlet means is about 3.12 square inches for every cubic foot of volume enclosed by said main container and said main container cover when the container cover is in place upon said main container, times the fraction having the aforesaid numerator and denominator.

46. The automatic cleaning gas barbecue grill of claim 40 in which said main combustion chamber volume, and said vertical distances relating to the gas burner horizontal positioning plane and the top surface of said grate, are all selected from generally similar positions within the applicable ranges of numerical values for respective volume or vertical distance.

* * * * *